(12) United States Patent
Noda

(10) Patent No.: US 11,104,209 B2
(45) Date of Patent: Aug. 31, 2021

(54) LAMINATED GLASS

(71) Applicant: Nippon Electric Glass Co., Ltd., Shiga (JP)

(72) Inventor: Takayuki Noda, Shiga (JP)

(73) Assignee: NIPPON ELECTRIC GLASS CO., LTD., Shiga (JP)

(*) Notice: Subject to any disclaimer, the term of this patent is extended or adjusted under 35 U.S.C. 154(b) by 201 days.

(21) Appl. No.: 16/344,889

(22) PCT Filed: Oct. 25, 2017

(86) PCT No.: PCT/JP2017/038454
§ 371 (c)(1),
(2) Date: Apr. 25, 2019

(87) PCT Pub. No.: WO2018/084041
PCT Pub. Date: May 11, 2018

(65) Prior Publication Data
US 2019/0263227 A1    Aug. 29, 2019

(30) Foreign Application Priority Data
Nov. 7, 2016  (JP) .............................. JP2016-216875

(51) Int. Cl.
*B32B 3/00* (2006.01)
*B60J 1/00* (2006.01)
(Continued)

(52) U.S. Cl.
CPC .................. *B60J 1/001* (2013.01); *B32B 7/02* (2013.01); *B32B 7/12* (2013.01); *B32B 17/10* (2013.01);
(Continued)

(58) Field of Classification Search
CPC .................................... B60J 1/001; B60J 1/02
See application file for complete search history.

(56) References Cited

U.S. PATENT DOCUMENTS

| 4,985,099 A | 1/1991 | Mertens et al. |
| 2012/0128952 A1 | 5/2012 | Miwa et al. |

(Continued)

FOREIGN PATENT DOCUMENTS

| CN | 104395071 | 3/2015 |
| CN | 104755265 | 7/2015 |

(Continued)

OTHER PUBLICATIONS

International Search Report dated Dec. 5, 2017 in International (PCT) Application No. PCT/JP2017/038454.
(Continued)

*Primary Examiner* — Elizabeth E Mulvaney
(74) *Attorney, Agent, or Firm* — Wenderoth, Lind & Ponack, L.L.P.

(57) ABSTRACT

Provided is a laminated glass (10), including: a core material (11) including a resin sheet (12); and a first glass sheet (13a) and a second glass sheet (13b) each being laminated on respective surfaces of the core material (11) via an adhesive layer (15a) or (15b). Each of thicknesses of the first glass sheet (13a) and the second glass sheet (13b) is smaller than a thickness of the core material (11). The first glass sheet (13a) has a cover sheet (14) made of a resin laminated on an outer surface thereof via an adhesive layer (15c). With this, the laminated glass has a light weight, and its partial breakage due to collision with a flying object can be suppressed. Each of the thicknesses of the first glass sheet (13a) and the second glass sheet (13b) is preferably ⅕ or less of the thickness of the core material (11).

10 Claims, 3 Drawing Sheets

(51) Int. Cl.
*B32B 7/02* (2019.01)
*B32B 7/12* (2006.01)
*B32B 17/10* (2006.01)
*B61D 25/00* (2006.01)

(52) U.S. Cl.
CPC .. *B32B 17/10036* (2013.01); *B32B 17/10752* (2013.01); *B32B 17/10761* (2013.01); *B60J 1/00* (2013.01); *B32B 2307/558* (2013.01); *B32B 2307/584* (2013.01); *B32B 2307/732* (2013.01); *B32B 2605/006* (2013.01); *B61D 25/00* (2013.01)

(56) References Cited

U.S. PATENT DOCUMENTS

| | | |
|---|---|---|
| 2015/0158277 A1 | 6/2015 | Fisher et al. |
| 2015/0174861 A1 | 6/2015 | Hasegawa et al. |
| 2016/0236383 A1 | 8/2016 | Miyazaki |
| 2016/0257094 A1 | 9/2016 | Lestringant et al. |

FOREIGN PATENT DOCUMENTS

| | | |
|---|---|---|
| JP | 2-31925 | 2/1990 |
| JP | 10-119184 | 5/1998 |
| JP | 2000-1345 | 1/2000 |
| JP | 2015-526367 | 9/2015 |
| WO | 2011/152380 | 12/2011 |
| WO | 2012/157617 | 11/2012 |
| WO | 2015/093352 | 6/2015 |

OTHER PUBLICATIONS

Extended European Search Report dated May 13, 2020 in corresponding European Patent Application No. 17867155.8.
International Preliminary Report on Patentability and Written Opinion of the International Searching Authority dated May 7, 2019 in International (PCT) Application No. PCT/JP2017/038454.
Notice of Reasons for Refusal dated Oct. 9, 2020 in corresponding Japanese Patent Application No. 2016-216875, with English Machine Translation.
Office Action dated May 14, 2021 in corresponding Chinese Patent Application No. 201780063934.1, with English translation of Search Report.

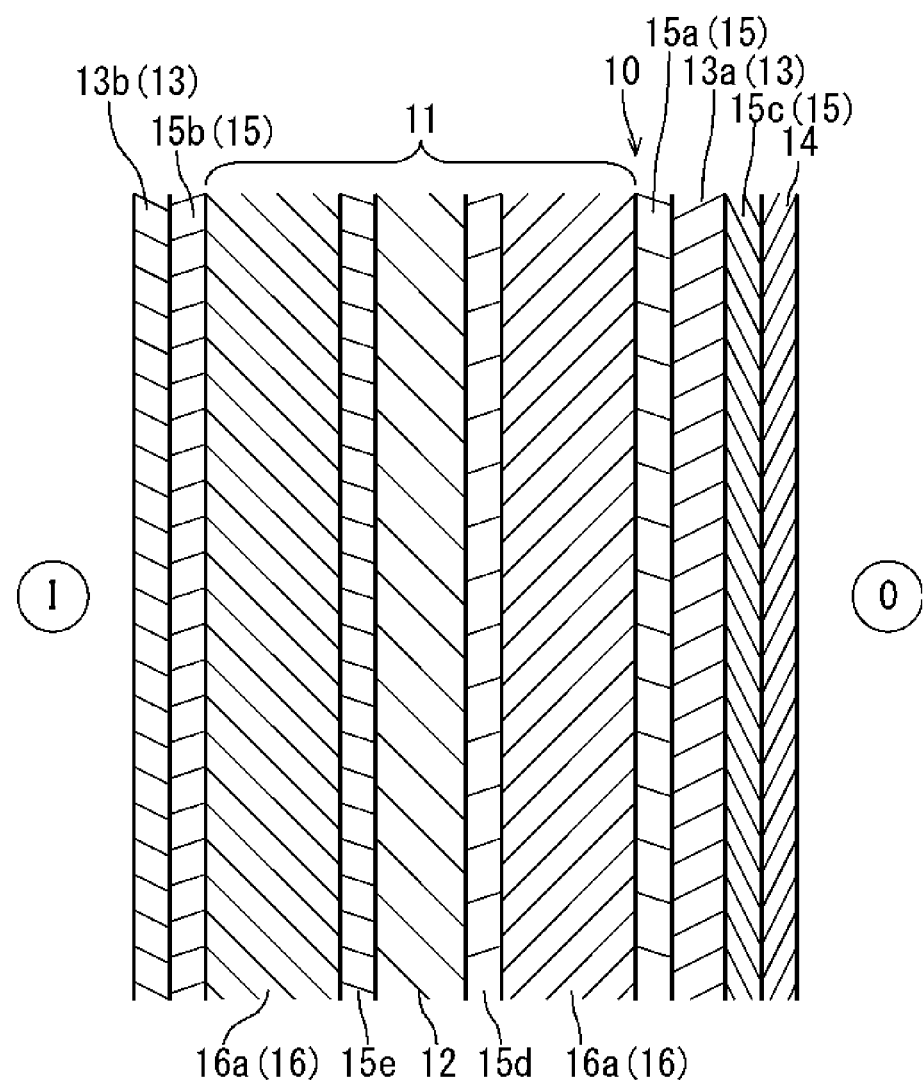

LAMINATED GLASS

TECHNICAL FIELD

The present invention relates to a laminated glass in which each of glass sheets is laminated on both surfaces of a core material via an adhesive layer.

BACKGROUND ART

In general, a single-layer sheet glass is used as a window glass. However, the single-layer sheet glass is liable to be broken by cracking and has a large mass. Therefore, there is a demand for a window glass having higher safety and a lighter weight. For a window glass of a vehicle (e.g., an automobile, a railway vehicle, or an aircraft), it is particularly important to have safety and a light weight. In this respect, in Patent Literature 1, there is disclosed that a laminated glass is used as the window glass instead of the sheet glass.

The laminated glass described in Patent Literature 1 has a configuration in which each of the glass sheets is laminated on both surfaces of the core material made of polycarbonate via an adhesive layer. The glass sheets each have a thickness of from 0.05 mm to 1.50 mm, and the core material made of polycarbonate has a thickness of from 0.10 mm to 8.00 mm. There is described that weight saving and high durability can be achieved by adopting such configuration.

In addition, in Patent Literature 2, there is described a transparent laminate. The transparent laminate has a configuration in which a glass sheet, an intermediate film, a hot melt-type urethane-based adhesive layer, and a polycarbonate sheet are laminated in the stated order. The intermediate film has a configuration in which a polyvinyl butyral film, a resin layer, and a polyvinyl butyral film are laminated in the stated order, and a resin having a higher viscosity than the polyvinyl butyral film at room temperature is used for the resin layer. The intermediate film has a thickness of from 0.2 mm to 1.3 mm, and the hot melt-type urethane-based adhesive layer has a thickness of from 0.1 mm to 0.8 mm. In addition, while the glass sheet has a thickness of from about 2 mm to about 6 mm, the polycarbonate sheet has a thickness of from about 1 mm to about 5 mm.

CITATION LIST

Patent Literature 1: WO 2012/157617 A1
Patent Literature 2: JP 10-119184 A

SUMMARY OF INVENTION

Technical Problem

In a vehicle moving at high speed (e.g., at 100 km/h or more), such as a high-speed railway train, a window glass is required to have higher safety, and in particular, it is important for the window glass to ensure safety against a flying object. Specifically, there sometimes occurs a situation in which a flying object, such as a stone or ice, collides with the window glass of the high-speed railway train at high speed while the train is moving. In addition, when the train passes an oncoming train, a flying stone or a released object flies from point-blank range at high speed and collides with the window glass.

In the laminated glass described in Patent Literature 1 above, the thickness of the glass sheet is reduced for weight saving. In this case, when a flying object collides with the glass sheet at high speed, cracks occur on part of a surface of the glass sheet, and the cracks develop in a thickness direction of the glass sheet to penetrate through the glass sheet. Therefore, the glass sheet is easily partially broken. There is low possibility that the cracks propagate to the core material made of polycarbonate, and hence there is no risk of immediate scattering of broken glass pieces. However, the aesthetic appearance of the laminated glass is impaired. In addition, when the glass sheet is partially broken, the core material made of polycarbonate deteriorates from the part as an origin, and hence the functions of the window glass deteriorate. Therefore, it is desired that the laminated glass in which the glass sheet is partially broken be replaced.

In the transparent laminate described in Patent Literature 2 above, the glass sheet, the intermediate film, the hot melt-type urethane-based adhesive layer, and the polycarbonate sheet are laminated in the stated order, and hence a flying object collides with the polycarbonate sheet. In this case, cracks do not penetrate through the polycarbonate sheet in a thickness direction, and the polycarbonate sheet is only partially hollowed.

However, in the transparent laminate described in Patent Literature 2, the glass sheet and the polycarbonate sheet having different thermal expansion characteristics are laminated on each other, and hence warpage occurs. In order to absorb the warpage, the special intermediate film and the special hot melt-type urethane-based adhesive layer are used in the transparent laminate described in Patent Literature 2. In this case, there is a tendency that the intermediate film and the hot melt-type urethane-based adhesive layer have large thicknesses. Besides, in order to balance stiffness between the glass sheet and the polycarbonate sheet, it is required to achieve a predetermined thickness ratio between the glass sheet and the polycarbonate sheet. As a result, the ratio of the glass sheet in the transparent laminate is increased, and weight saving becomes insufficient.

The present invention has been made in view of the above-mentioned circumstances, and an object of the present invention is to provide a laminated glass which has a light weight, and in which partial breakage due to collision with a flying object can be suppressed.

Solution to Problem

A laminated glass according to an embodiment of the present invention is as described below.

(1) A laminated glass, comprising: a core material including a resin sheet; and a first glass sheet and a second glass sheet laminated on respective surfaces of the core material via an adhesive layer, wherein each of thicknesses of the first glass sheet and the second glass sheet is smaller than a thickness of the core material, and wherein the first glass sheet has a cover sheet made of a resin laminated on an outer surface thereof via an adhesive layer.

(2) The laminated glass according to Item (1), wherein each of the thicknesses of the first glass sheet and the second glass sheet is ⅕ or less of the thickness of the core material.

(3) The laminated glass according to Item (1) or (2), wherein the thickness of the first glass sheet differs from the thickness of the second glass sheet.

(4) The laminated glass according to any one of Items (1) to (3), wherein the thickness of the first glass sheet is larger than the thickness of the second glass sheet.

(5) The laminated glass according to any one of Items (1) to (4), wherein a thickness of the cover sheet is from 0.1 mm to 5 mm.

(6) The laminated glass according to any one of Items (1) to (5), wherein the cover sheet comprises a protective film on an outer surface thereof.

(7) The laminated glass according to any one of Items (1) to (6), wherein the core material consists of the resin sheet.

(8) The laminated glass according to any one of Items (1) to (6), wherein the core material further comprises at least one sheet-shaped member made of a resin laminated on the resin sheet via an adhesive layer.

(9) The laminated glass according to Item (8), wherein the at least one sheet-shaped member made of a resin is formed of a material different from a material of the resin sheet.

(10) The laminated glass according to any one of Items (1) to (9), wherein the resin sheet is formed of polycarbonate, acrylic, or polyethylene terephthalate, and wherein the cover sheet is formed of polycarbonate, acrylic, or polyethylene terephthalate.

(11) The laminated glass according to any one of Items (1) to (10), wherein each of the first glass sheet and the second glass sheet is an alkali-free glass sheet.

(12) The laminated glass according to any one of Items (1) to (11), wherein the laminated glass is used as a window glass of a vehicle.

In the present invention, the "outer surface" means, out of both surfaces (a front surface and a back surface) of the glass sheet or the cover sheet, a surface on a farther side from the core material.

Advantageous Effects of Invention

The laminated glass of the present invention comprises the first glass sheet and the second glass sheet laminated on both the surfaces of the core material, and hence the ratio (mass %) of the glass sheets in the laminated glass can be reduced, and weight saving can be achieved. In addition, the cover sheet made of a resin is laminated on the outer surface of the first glass sheet, and hence, even when a flying object collides at high speed, cracks hardly occur in the cover sheet. As a result, breakage due to collision with the flying object can be suppressed.

BRIEF DESCRIPTION OF DRAWINGS

FIG. 3 is a sectional view for schematically illustrating a laminated glass according to a third embodiment.

DESCRIPTION OF EMBODIMENTS

Now, a laminated glass according to an embodiment of the present invention (hereinafter also referred to as "this embodiment") is described with reference to laminated glasses of a first embodiment to a third embodiment.

Figure 1:
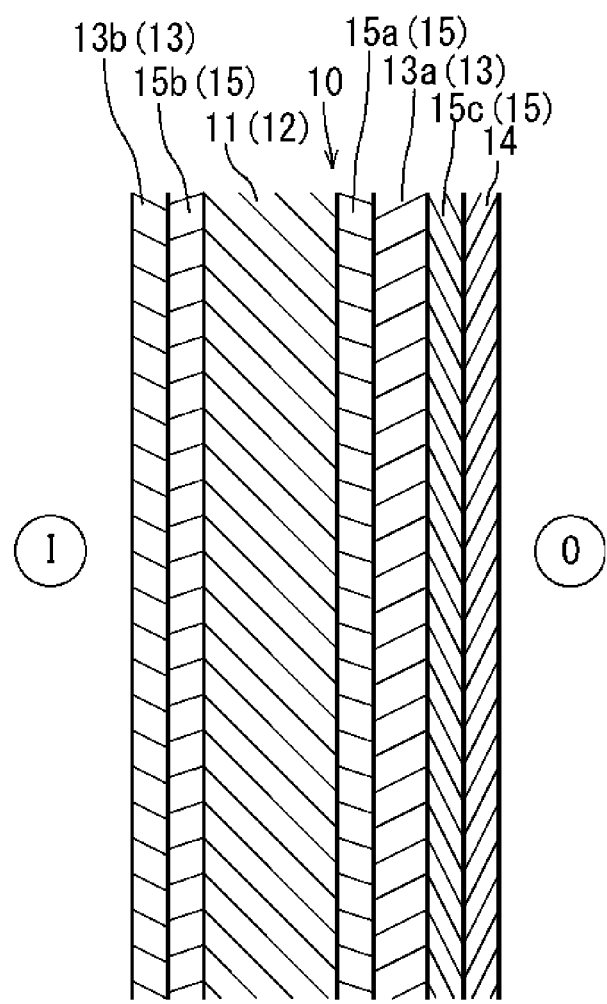
FIG. 1 is a sectional view for schematically illustrating a laminated glass according to a first embodiment.

FIG. 1 is a sectional view for schematically illustrating the laminated glass of the first embodiment. A laminated glass 10 of the first embodiment comprises: a core material 11 (resin sheet 12); and a first glass sheet 13a and a second glass sheet 13b laminated on both surfaces of the core material 11. The core material 11 consists of the resin sheet 12. A cover sheet 14 made of a resin is laminated on an outer surface of the first glass sheet 13a.

Each of the first glass sheet 13a, the second glass sheet 13b, and the cover sheet 14 is laminated via an adhesive layer 15a, 15b, or 15c. In other words, the first glass sheet 13a, the second glass sheet 13b, and the cover sheet 14 are integrated with the core material 11 via the adhesive layers 15a to 15c.

The thickness of the first glass sheet 13a and the thickness of the second glass sheet 13b are each smaller than the thickness of the core material 11. With this, the ratio (mass %) of glass sheets 13 in the laminated glass 10 is reduced. Therefore, the laminated glass 10 of this embodiment can achieve weight saving.

The cover sheet 14 made of a resin is laminated on the outer surface of the first glass sheet 13a. In addition, when the laminated glass 10 is used as a window glass of a vehicle, the cover sheet 14 is arranged on a vehicle outer O side, and the second glass sheet 13b is arranged on a vehicle inner I side. Therefore, a flying object is brought into contact with the cover sheet 14 made of a resin. The cover sheet 14 made of a resin has high toughness, and hence, even when the flying object collides at high speed, cracks hardly occur in the cover sheet 14. In addition, an impact is absorbed and dispersed in the cover sheet 14, and hence the occurrence of cracks in the first glass sheet 13a can be suppressed, and partial breakage of the first glass sheet 13a can be prevented. Thus, in the laminated glass 10 of this embodiment, breakage due to collision with the flying object can be suppressed.

When each of the thicknesses of the glass sheets 13 (the first glass sheet 13a and the second glass sheet 13b) is ⅕ or less of the thickness of the core material 11, the ratio of the first glass sheet 13a and the second glass sheet 13b (hereinafter also referred to simply as "ratio of the glass sheets 13") in the laminated glass 10 can be reduced to, for example, about 44 mass % or less. Thus, the laminated glass 10 can achieve further weight saving. Therefore, each of the thicknesses of the glass sheets 13 is preferably ⅕ or less of the thickness of the core material 11. Each of the thicknesses of the glass sheets 13 is more preferably ⅐ or less of the thickness of the core material 11. With this, the ratio of the glass sheets 13 can be reduced to, for example, about 36 mass % or less. Each of the thicknesses of the glass sheets 13 is most preferably 1/10 or less of the thickness of the core material 11. With this, the ratio of the glass sheets 13 can be reduced to, for example, about 29 mass % or less.

More specifically, each of the thicknesses of the glass sheets 13 is preferably 2 mm or less, more preferably 1.5 mm or less, most preferably 1.3 mm or less.

Meanwhile, from the viewpoint of further increasing strength, each of the thicknesses of the glass sheets is preferably 0.05 mm or more, more preferably 0.1 mm or more, most preferably 0.15 mm or more.

The thickness of the first glass sheet 13a may be the same as the thickness of the second glass sheet 13b. Alternatively, the thickness of the second glass sheet 13b may be larger than the thickness of the first glass sheet 13a. Further alternatively, as in the laminated glass 10 of the first embodiment, the thickness of the first glass sheet 13a may be larger than the thickness of the second glass sheet 13b.

When the thickness of the second glass sheet 13b is larger than the thickness of the first glass sheet 13a, the strength of the second glass sheet 13b to be exposed can be further increased.

Incidentally, when sheet-shaped materials formed of different materials are laminated on each other, warpage is liable to occur owing to a difference in thermal expansion coefficient. Particularly when the materials are laminated on each other via an adhesive layer formed of a hot melt-type adhesive, the sheet-shaped materials expand and contract owing to heat in that course, and the warpage tends to be increased. In the laminated glass 10 of this embodiment, the first glass sheet 13a and the second glass sheet 13b are laminated on both the surfaces of the core material 11, and hence the warpage can be reduced.

When the thickness of the first glass sheet 13a is larger than the thickness of the second glass sheet 13b, the warpage of the laminated glass 10 can be further reduced. This is because the thermal expansion characteristics of a composite material formed of the first glass sheet 13a and the cover sheet 14 approach the thermal expansion characteristics of the glass sheets 13, and the core material 11 has nearly equal thermal expansion amounts and thermal contraction amounts on both sides thereof.

From the viewpoint of further reducing the warpage of the laminated glass 10, a thickness ratio (thickness of the first glass sheet 13a/thickness of the second glass sheet 13b, no unit) is preferably from 1.2 to 5, more preferably from 1.5 to 4, most preferably from 1.5 to 3.

The thickness of the cover sheet 14 suitable for obtaining a suppressing effect on the partial breakage of the first glass sheet 13a exhibited by the cover sheet 14 varies depending on the kind and the speed of a flying object. From the viewpoint of reliably suppressing the partial breakage of the first glass sheet 13a with the cover sheet 14, the thickness of the cover sheet 14 is preferably 0.1 mm or more, more preferably 0.5 mm or more, most preferably 1 mm or more.

The suppressing effect on the partial breakage of the first glass sheet 13a exhibited by the cover sheet 14 is increased along with an increase in thickness of the cover sheet 14, but is saturated when the thickness of the cover sheet 14 exceeds a certain thickness. Therefore, the thickness of the cover sheet 14 is preferably smaller than the thickness of the core material 11, and is more preferably 5 mm or less, still more preferably 4 mm or less, most preferably 3 mm or less.

The cover sheet 14 of the first embodiment is free of a protective film on an outer surface thereof, and the outer surface of the cover sheet 14 is exposed. In the laminated glass 10 of this embodiment, the cover sheet 14 may comprise a protective film on the outer surface. A hard coat film, a self-healing film, an ultraviolet light shielding film, or the like may be adopted as the protective film. When the cover sheet 14 comprises the hard coat film or the self-healing film on the outer surface, flaws on the cover sheet 14 made of a resin can be reduced, and the weather resistance of the laminated glass can be improved. The hard coat film may be, for example, a hard coat film formed of a melamine-based resin, a urethane-based resin, or an acrylic resin, or a silane compound-based or metal oxide-based hard coat film. In addition, the self-healing film may be, for example, a urethane resin-based, silicone resin-based, acrylic resin-based, or fluorine resin-based self-healing film.

Alternatively, when the ultraviolet light shielding film is adopted as the protective film, the cover sheet 14, and the resin sheet 12 and a sheet-shaped member 16 made of a resin described below of the core material 11 can be protected from ultraviolet light (e.g., ultraviolet light included in solar light) derived from an external environment. When the cover sheet 14 is arranged on, for example, the vehicle outer O side, the cover sheet 14, and the resin sheet 12 and the sheet-shaped member 16 made of a resin described below of the core material 11 are liable to deteriorate owing to the ultraviolet light derived from an external environment. In such case, it is preferred that the protective film be the ultraviolet light shielding film. It is also preferred that the protective film be a hard coat film having an ultraviolet light shielding function or a self-healing film having an ultraviolet light shielding function. The ultraviolet light shielding film and the like may be formed using a coating liquid containing an ultraviolet light shielding agent.

The core material 11 of the first embodiment consists of a sheet of the resin sheet 12. In the laminated glass 10 of this embodiment, the core material 11 may further comprise the sheet-shaped member 16 made of a resin laminated on the resin sheet 12. This aspect is described with reference to the second embodiment and the third embodiment.

Figure 2:
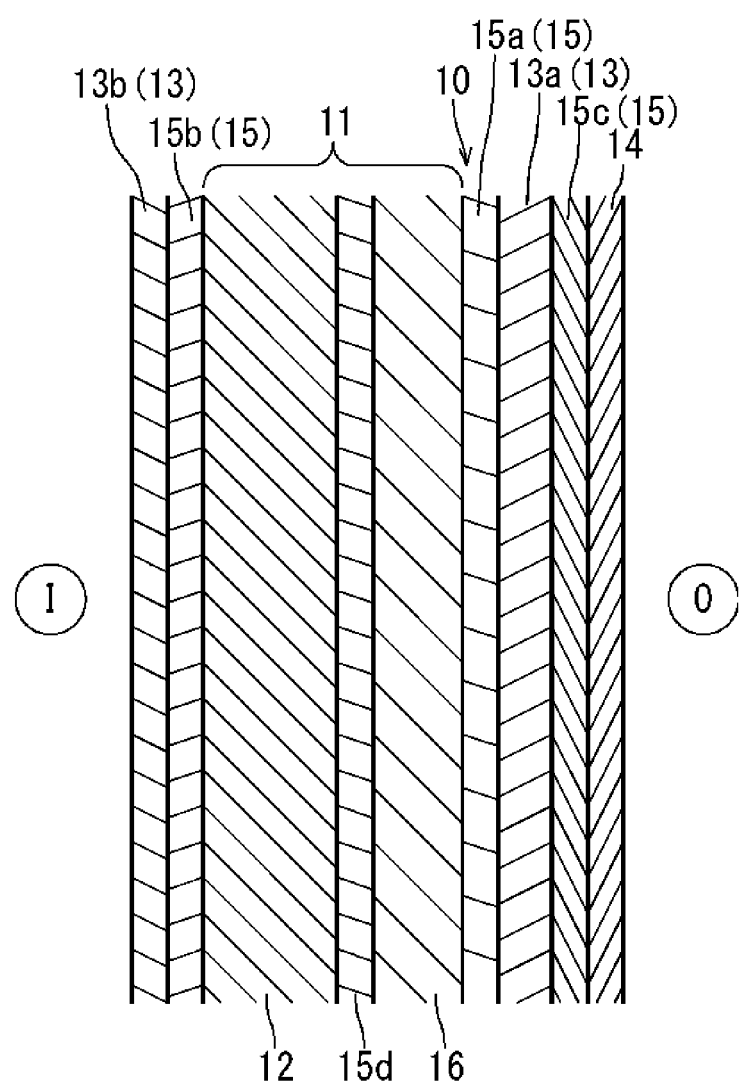
FIG. 2 is a sectional view for schematically illustrating a laminated glass according to a second embodiment.

FIG. 2 is a sectional view for schematically illustrating a laminated glass 10 of the second embodiment, and FIG. 3 is a sectional view for schematically illustrating a laminated glass 10 of the third embodiment. The laminated glasses 10 of the second embodiment and the third embodiment each differ from the laminated glass 10 of the first embodiment in the configuration of a core material 11. A core material 11 of the second embodiment further comprises a sheet-shaped member 16 made of a resin laminated on one surface of a resin sheet 12 via an adhesive layer 15d. The sheet-shaped member 16 made of a resin is inserted between the resin sheet 12 and a first glass sheet 13a, and is integrated with the resin sheet 12 with the adhesive layer 15d.

A core material 11 of the third embodiment further comprises, in addition to a resin sheet 12, a first sheet-shaped member 16a made of a resin laminated on one surface of the resin sheet 12 via an adhesive layer 15d, and a second sheet-shaped member 16b made of a resin laminated on the other surface of the resin sheet 12 via an adhesive layer 15e. The first sheet-shaped member 16a made of a resin is inserted between the resin sheet 12 and a first glass sheet 13a, and the second sheet-shaped member 16b made of a resin is inserted between the resin sheet 12 and a second glass sheet 13b. The first sheet-shaped member 16a made of a resin and the second sheet-shaped member 16b made of a resin are integrated with the resin sheet 12 with the adhesive layers 15d and 15e, respectively.

A material of the same kind as or a different kind from that of the resin sheet 12 may be adopted for the sheet-shaped member 16 made of a resin. The core material 11 may comprise a sheet or a plurality of sheets of the sheet-shaped members 16 made of a resin. When the plurality of sheets of the sheet-shaped members 16 made of a resin are included, the number of the sheet-shaped members 16 made of a resin is preferably set to 4 or less from the viewpoint of suppressing an increase in production cost.

A colorless and transparent resin may be adopted for each of the resin sheet 12, the member 16 made of a resin, and the cover sheet 14 made of a resin. In this case, when any one of the resins adopted for the resin sheet 12, the member 16 made of a resin, and the cover sheet 14 made of a resin is changed into a colored transparent resin, the laminated glass can be colored. In addition, when the core material 11 comprises the member 16 made of a resin, and a colored transparent resin is adopted for the resin sheet 12 or the member 16 made of a resin, color density may be adjusted by changing the thickness of a colored transparent member.

Any one of the resins adopted for the resin sheet 12, the member 16 made of a resin, and the cover sheet 14 made of a resin may be changed into a resin having a heat shielding property, an ultraviolet light shielding property, an electromagnetic wave shielding property, or conductivity, or a matte-finished resin. With this, those functions can be imparted to the laminated glass 10. As described above, when the cover sheet 14 is arranged on, for example, the vehicle outer O side, the resin sheet 12 is liable to deteriorate owing to ultraviolet light derived from an external environment. In such case, the cover sheet 14 made of a resin is preferably formed of the resin having an ultraviolet light shielding property.

For example, polycarbonate, acrylic, polyethylene terephthalate (PET), polypropylene (PP), a urethane resin, a vinyl chloride resin, or a cycloolefin polymer (COP) may be adopted for each of the resin sheet 12, the member 16 made of a resin, and the cover sheet 14 made of a resin. Of those, polycarbonate, acrylic, or PET is preferably adopted because the resin is a general-purpose and inexpensive resin excellent in visible light transmittivity.

For example, silicate glass, silica glass, borosilicate glass, soda lime glass, aluminosilicate glass, or alkali-free glass may be adopted for the glass sheets 13 (the first glass sheet 13a and the second glass sheet 13b). It is preferred to adopt borosilicate glass from the viewpoint of improving the heat resistance and the chemical resistance of the laminated glass 10. In addition, it is preferred to adopt soda lime glass, which is general-purpose and inexpensive glass, from the viewpoint of reducing the production cost of the laminated glass. It is preferred to adopt aluminosilicate glass from the viewpoint of improving the heat resistance and the strength of the laminated glass 10. It is most preferred to adopt alkali-free glass from the viewpoint of improving the transparency, the weather resistance, and the chemical resistance of the laminated glass 10.

For example, the glass sheets 13 formed by a down-draw method or a float method may be utilized as the glass sheets 13. Herein, an overflow down-draw method, a slot down-draw method, or a redraw method corresponds to the down-draw method. It is preferred to use the glass sheets 13 formed by an overflow down-draw method, that is, the glass sheets 13 having both surfaces serving as fire-polished surfaces because such glass sheets 13 have high surface quality.

A material of each of the adhesive layers 15 is not particularly limited, and for example, an adhesive layer using a double-sided pressure-sensitive adhesive sheet, a thermoplastic adhesive sheet, a thermally cross-linkable adhesive sheet, an energy-curable liquid adhesive, or the like may be adopted. For example, an adhesive layer using an optically transparent pressure-sensitive adhesive sheet (OCA), an ethylene-vinyl acetate copolymer resin (EVA), thermoplastic polyurethane (TPU), COP, a thermoplastic acrylic adhesive sheet, an ultraviolet light-curable adhesive, a thermosetting adhesive, a room temperature setting adhesive, or the like may be adopted.

The adhesive layers 15 each preferably have an ultraviolet light shielding property so that the resin sheet 12 and the sheet-shaped member 16 made of a resin of the core material 11 are protected from ultraviolet light (e.g., ultraviolet light included in solar light) derived from an external environment. When an adhesive containing a UV absorber is adopted, the adhesive layers 15 can each be provided with an ultraviolet light shielding property. In this case, from the viewpoint of improving an adhesive property and the weather resistance, a hot melt-type adhesive containing a UV absorber is more preferably adopted.

From the viewpoint of effectively shielding the ultraviolet light, the adhesive layer 15b between the second glass sheet 13b and the core material 11 and the adhesive layer 15c between the cover sheet 14 and the first glass sheet 13a each preferably have an ultraviolet light shielding property. From the viewpoint of shielding the ultraviolet light to the extent possible, all the adhesive layers 15 preferably have an ultraviolet light shielding property.

While the suitable thicknesses of the adhesive layers 15 vary depending on the dimensions (length and width) of the laminated glass 10, the thickness of each member, and the like, the thicknesses of the adhesive layers 15 are each, for example, preferably 0.05 mm or more, more preferably 0.1 mm or more, most preferably 0.2 mm or more from the viewpoint of absorbing the warpage of the laminated glass 10 due to a difference in thermal expansion coefficient in the adhesive layers 15. Meanwhile, each of the thicknesses of the adhesive layers 15 is, for example, preferably 2 mm or less, more preferably 1.7 mm or less, most preferably 1 mm or less because an increase in thickness of each of the adhesive layers 15 causes a reduction in visible light transmittivity.

EXAMPLES

The laminated glass of the present invention is hereinafter described in detail by way of Examples. The present invention is by no means limited to these Examples.

Example 1

In Example 1, a laminated glass 10 having the same configuration as the above-mentioned laminated glass 10 illustrated in FIG. 1 was produced. The laminated glass 10 having been produced had outer dimensions measuring 550 mm×650 mm. The configuration of each member of the laminated glass is shown in Table 1.

TABLE 1

| | Material and characteristics | Thickness [mm] |
|---|---|---|
| Cover sheet 14 | Made of polycarbonate Silicone-based hard coat film present on outer surface | 2 |
| Adhesive layer 15c | Hot melt-type EVA-based thermoplastic adhesive | 0.4 |
| First glass sheet 13a | Alkali-free glass | 0.5 |
| Adhesive layer 15a | Hot melt-type EVA-based thermoplastic adhesive | 0.4 |
| Core material 11 (resin sheet 12) | Made of general-purpose, and colorless and transparent polycarbonate | 15 |
| Adhesive layer 15b | Hot melt-type EVA-based thermoplastic adhesive | 0.4 |
| Second glass sheet 13b | Alkali-free glass | 0.2 |

A stone was caused to collide with the laminated glass 10 of Example 1 at high speed so as to simulate a flying stone in use as a window glass of a high-speed railway vehicle. More specifically, the stone was caused to collide with the cover sheet 14 to be arranged on a vehicle outer side at from about 100 km/h to about 200 km/h. In the laminated glass 10 of Example 1, the thickness of the cover sheet 14 made of polycarbonate was set to 2 mm, and hence, even when the stone collided with the laminated glass 10 at high speed, the cover sheet 14 was only slightly hollowed. Therefore, partial breakage of the first glass sheet 13a inside the cover sheet 14 was able to be prevented. In addition, the cover sheet 14 had a silicone-based hard coat film on the outer surface thereof, and hence flaws were able to be reduced.

The first glass sheet 13a and the second glass sheet 13b were laminated on both surfaces of the core material 11. In addition, the thickness of the first glass sheet 13a was set to be larger than the thickness of the second glass sheet 13b, and the thickness ratio (thickness of the first glass sheet 13a/thickness of the second glass sheet 13b) was set to 2.5.

With this, the warpage of the laminated glass in its entirety was able to be almost eliminated (reduced to zero).

Example 2

In Example 2, a laminated glass 10 having the same configuration as the above-mentioned laminated glass 10 illustrated in FIG. 1 was produced. The laminated glass 10 having been produced had outer dimensions measuring 450 mm×550 mm. The configuration of each member of the laminated glass 10 is shown in Table 2.

TABLE 2

|  | Material and characteristics | Thickness [mm] |
| --- | --- | --- |
| Cover sheet 14 | Made of acrylic No film (coating) on outer surface | 1 |
| Adhesive layer 15c | UV-curable resin (adhesive) | 0.5 |
| First glass sheet 13a | Alkali-free glass | 0.3 |
| Adhesive layer 15a | UV-curable resin (adhesive) | 0.5 |
| Core material 11 (resin sheet 12) | Made of general-purpose, and colorless and transparent polycarbonate | 8 |
| Adhesive layer 15b | UV-curable resin (adhesive) | 0.5 |
| Second glass sheet 13b | Alkali-free glass | 0.2 |

A stone was caused to collide with the laminated glass 10 of Example 2 so as to simulate a flying stone in use as a window glass of a general railway vehicle. More specifically, the stone was caused to collide with the cover sheet 14 to be arranged on a vehicle outer side at from about 70 km/h to about 100 km/h. In the laminated glass 10 of Example 2, the acrylic cover sheet 14 having a thickness of 1 mm was laminated on the first glass sheet 13a, and hence partial breakage of the first glass sheet 13a due to collision with a flying stone was able to be prevented. In addition, acrylic, which had a relatively high surface hardness among resins, was used for the cover sheet 14, and hence flaws on the cover sheet 14 were able to be reduced without hard coat treatment.

In Example 2, the thickness of the cover sheet 14 was as small as 1 mm, which was smaller than in Example 1. Therefore, even when the thickness of the first glass sheet 13a was set to be as small as 0.3 mm, and the thickness ratio (thickness of the first glass sheet 13a/thickness of the second glass sheet 13b) was set to 1.5, the warpage of the laminated glass in its entirety was able to be almost eliminated (reduced to zero).

Example 3

In Example 3, a laminated glass 10 having the same configuration as the above-mentioned laminated glass 10 illustrated in FIG. 1 was produced. The laminated glass 10 having been produced had outer dimensions measuring 1,150 mm×2,350 mm. The configuration of each member of the laminated glass 10 is shown in Table 3.

TABLE 3

|  | Material and characteristics | Thickness [mm] |
| --- | --- | --- |
| Cover sheet 14 | Made of polycarbonate Acrylic hard coat film present on outer surface | 2 |
| Adhesive layer 15c | Hot melt-type TPU-based thermoplastic adhesive | 0.8 |

TABLE 3-continued

|  | Material and characteristics | Thickness [mm] |
| --- | --- | --- |
| First glass sheet 13a | Alkali-free glass | 0.7 |
| Adhesive layer 15a | Hot melt-type TPU-based thermoplastic adhesive | 0.8 |
| Core material 11 (resin sheet 12) | Made of general-purpose, and colorless and transparent polycarbonate | 10 |
| Adhesive layer 15b | Hot melt-type TPU-based thermoplastic adhesive | 0.8 |
| Second glass sheet 13b | Alkali-free glass | 0.5 |

Exercise equipment and a ball were caused to collide with the laminated glass 10 of Example 3 so that collision with a flying object (exercise equipment, a ball, or the like) in use as a window glass of a door in sports facilities was simulated. More specifically, the exercise equipment and the ball were caused to collide with the cover sheet 14 to be arranged on a sports ground side. In the laminated glass 10 of Example 3, the cover sheet 14 made of polycarbonate having a thickness of 2 mm was laminated on the first glass sheet 13a, and hence partial breakage of the first glass sheet 13a due to collision with the exercise equipment and the like was able to be prevented. Besides, a test for simulating collision with a human body was performed. In Example 3, thermoplastic polyurethane (TPU) was adopted for the adhesive layers, and hence the toughness of the laminated glass 10 was able to be increased, and also partial breakage of the first glass sheet 13a due to collision with the human body was able to be prevented.

In Example 3, the thickness of the second glass sheet 13b was as large as 0.5 mm, and hence the laminated glass 10 was able to ensure surface strength as a window glass for a building material. In addition, the thickness of the first glass sheet 13a was set to 0.7 mm, which was larger than the thickness of the second glass sheet 13b, and the thickness ratio (thickness of the first glass sheet 13a/thickness of the second glass sheet 13b) was set to 1.4. With this, the warpage of the laminated glass in its entirety was able to be almost eliminated (reduced to zero).

Example 4

In Example 4, a laminated glass 10 having the same configuration as the above-mentioned laminated glass 10 illustrated in FIG. 1 was produced. The laminated glass 10 having been produced had outer dimensions measuring 350 mm×450 mm. The configuration of each member of the laminated glass 10 is shown in Table 4.

TABLE 4

|  | Material and characteristics | Thickness [mm] |
| --- | --- | --- |
| Cover sheet 14 | Made of PET Urethane-based self-healing film present on outer surface | 0.5 |
| Adhesive layer 15c | Hot melt-type EVA-based thermoplastic adhesive | 0.3 |
| First glass sheet 13a | Alkali-free glass | 1.1 |
| Adhesive layer 15a | Hot melt-type EVA-based thermoplastic adhesive | 0.3 |
| Core material 11 (resin sheet 12) | Made of general-purpose, and colorless and transparent polycarbonate | 6 |
| Adhesive layer 15b | Hot melt-type EVA-based thermoplastic adhesive | 0.3 |

TABLE 4-continued

| | Material and characteristics | Thickness [mm] |
|---|---|---|
| Second glass sheet 13b | Alkali-free glass | 1.1 |

A stone was caused to collide with the laminated glass 10 of Example 4 so as to simulate a flying stone in use as a window glass of a vehicle luggage room. More specifically, the stone was caused to collide with the cover sheet 14 to be arranged on a vehicle outer side. In the laminated glass 10 of Example 4, the cover sheet 14 made of polyethylene terephthalate (PET) having a thickness of 0.5 mm was laminated on the first glass sheet 13a. Therefore, partial breakage of the first glass sheet 13a due to a flying stone was able to be prevented.

In addition, a test for simulating contact between a window glass and a luggage was performed. In Example 4, the thickness of the second glass sheet 13b was as large as 1.1 mm, which was larger than in Example 1. With this, breakage of the second glass sheet 13b in association with its contact with the luggage loaded in a vehicle was able to be prevented.

In Example 4, the thickness of the cover sheet 14 was smaller than the thickness of the first glass sheet 13a and the thickness of the second glass sheet. Therefore, the cover sheet 14 made of a resin less affected the warpage of the laminated glass 10. Thus, even when the thickness of the first glass sheet 13a and the thickness of the second glass sheet were the same, the warpage of the laminated glass 10 was able to be almost eliminated (reduced to zero). That is, the warpage of the laminated glass 10 was able to be almost eliminated (reduced to zero) merely by laminating the first glass sheet 13a and the second glass sheet 13b on both surfaces of the core material 11.

Example 5

In Example 5, a laminated glass 10 having the same configuration as the above-mentioned laminated glass 10 illustrated in FIG. 1 was produced. The laminated glass 10 having been produced had outer dimensions measuring 350 mm×450 mm. The configuration of each member of the laminated glass 10 is shown in Table 5.

TABLE 5

| | Material and characteristics | Thickness [mm] |
|---|---|---|
| Cover sheet 14 | Made of PET Urethane-based self-healing film present on outer surface | 0.1 |
| Adhesive layer 15c | Hot melt-type EVA-based thermoplastic adhesive | 0.3 |
| First glass sheet 13a | Alkali-free glass | 0.5 |
| Adhesive layer 15a | Hot melt-type EVA-based thermoplastic adhesive | 0.3 |
| Core material 11 (resin sheet 12) | Made of general-purpose, and colorless and transparent polycarbonate | 6 |
| Adhesive layer 15b | Hot melt-type EVA-based thermoplastic adhesive | 0.3 |
| Second glass sheet 13b | Alkali-free glass | 0.7 |

A stone was caused to collide with the laminated glass 10 of Example 5 so as to simulate a flying stone in use as a window glass of a low-speed vehicle luggage room. More specifically, the stone was caused to collide with the cover sheet 14 to be arranged on a vehicle outer side at from about 30 km/h to about 70 km/h. In such Example 5, even when the thickness of the cover sheet 14 was as small as 0.1 mm, which was smaller than in Example 4, partial breakage of the first glass sheet 13a due to collision with a flying object, such as a flying stone, was able to be prevented. As described above, in Example 5, the thickness of the cover sheet 14 was as small as 0.1 mm, and hence, even when the thickness of the first glass sheet 13a was set to be smaller than the thickness of the second glass sheet 13b, the warpage of the laminated glass 10 was able to be almost eliminated (reduced to zero). That is, the warpage of the laminated glass 10 was able to be almost eliminated (reduced to zero) merely by laminating the first glass sheet 13a and the second glass sheet 13b on both surfaces of the core material 11.

Example 6

In Example 6, a laminated glass 10 having the same configuration as the above-mentioned laminated glass 10 illustrated in FIG. 2 was produced. The laminated glass 10 having been produced had outer dimensions measuring 550 mm×650 mm. The configuration of each member of the laminated glass 10 is shown in Table 6. The laminated glass 10 of Example 6 had the same configuration as the laminated glass 10 of Example 1 except for the core material 11.

TABLE 6

| | Material and characteristics | Thickness [mm] |
|---|---|---|
| Cover sheet 14 | Made of polycarbonate Silane compound-based hard coat film present on outer surface | 2 |
| Adhesive layer 15c | Hot melt-type EVA-based thermoplastic adhesive | 0.4 |
| First glass sheet 13a | Alkali-free glass | 0.5 |
| Adhesive layer 15a | Hot melt-type EVA-based thermoplastic adhesive | 0.4 |
| Sheet-shaped resin member 16 | Made of polycarbonate having heat shielding property | 3 |
| Adhesive layer 15d | Hot melt-type EVA-based thermoplastic adhesive | 0.2 |
| Resin sheet 12 | Made of general-purpose, and colorless and transparent polycarbonate | 6 |
| Adhesive layer 15b | Hot melt-type EVA-based thermoplastic adhesive | 0.4 |
| Second glass sheet 13b | Alkali-free glass | 0.2 |

A stone was caused to collide with the laminated glass 10 of Example 6 so as to simulate a flying stone in use as a window glass of a general railway vehicle. More specifically, the stone was caused to collide with the cover sheet 14 to be arranged on a vehicle outer side. In the laminated glass 10 of Example 6, partial breakage of the first glass sheet 13a due to a flying object was able to be prevented, and the warpage of the laminated glass in its entirety was able to be almost eliminated (reduced to zero), as in the laminated glass 10 of Example 1.

In addition, in the laminated glass 10 of Example 6, polycarbonate having a heat shielding property was adopted for the sheet-shaped member 16 made of a resin. With this, the laminated glass 10 was able to be provided with a heat shielding property.

Comparative Example 1

In Comparative Example 1, a laminated glass consisting of a glass sheet and a resin sheet laminated on one surface of the glass sheet via an adhesive layer was produced. The laminated glass having been produced had outer dimensions measuring 550 mm×650 mm. The configuration of each member of the laminated glass is shown in Table 7.

TABLE 7

| | Material and characteristics | Thickness [mm] |
|---|---|---|
| Cover sheet | Made of general-purpose, and colorless and transparent polycarbonate | 3 |
| Adhesive layer | Hot melt-type EVA-based thermoplastic adhesive | 1.2 |
| Glass sheet | Soda glass | 4 |

In Comparative Example 1, the configuration of each member of the laminated glass was determined on the assumption that the laminated glass is used as a window glass of a general railway vehicle. At this time, in order to suppress the warpage of the laminated glass while ensuring the stiffness of the laminated glass, the thickness of the glass sheet was set to be as large as 4 mm, and the thickness of the adhesive layer was set to be as large as 1.2 mm. As a result, the ratio of the glass sheet in the laminated glass reached about 73 mass %, and thus weight saving of the laminated glass 10 was insufficient. This is because the density of the glass sheet is about twice as large as the density of polycarbonate.

Comparative Example 2

In Comparative Example 2, the thicknesses of a resin sheet and a glass sheet were set so that weight saving was able to be achieved to the same degree as in the laminated glass 10 of Example 1. A laminated glass having been produced had outer dimensions measuring 550 mm×650 mm. The configuration of each member of the laminated glass is shown in Table 8.

TABLE 8

| | Material and characteristics | Thickness [mm] |
|---|---|---|
| Cover sheet | Made of general-purpose, and colorless and transparent polycarbonate | 17 |
| Adhesive layer | Hot melt-type EVA-based thermoplastic adhesive | 0.4 |
| Glass sheet | Alkali-free glass | 0.2 |

In Comparative Example 2, the glass sheet was laminated on only one surface of the resin sheet (core material). Therefore, weight saving was slightly promoted as compared to Example 1, but large warpage occurred in the laminated glass. Therefore, the warpage was tried to be reduced by increasing the thickness of the adhesive layer, but was not be able to be reduced to a practical level. In this case, the thickness of the adhesive layer was increased excessively, an increasing effect on the stiffness of the laminated glass exhibited by the glass sheet became poor, and the stiffness of the laminated glass was reduced.

REFERENCE SIGNS LIST 10 laminated glass
11 core material
12 resin sheet
13 glass sheet
13a first glass sheet
13b second glass sheet
14 cover sheet
15, 15a to 15e adhesive layer
16 sheet-shaped member made of resin
16a first sheet-shaped member made of resin
16b second sheet-shaped member made of resin

The invention claimed is:

1. A laminated glass, comprising:
    a core material including a resin sheet;
    a first glass sheet laminated on a first surface of the core material via an adhesive layer; and
    a second glass sheet laminated on a second surface of the core material via an adhesive layer,
    wherein a thickness of the first glass sheet and a thickness of the second glass sheet are smaller than a thickness of the core material,
    wherein the first glass sheet has a cover sheet made of a resin laminated on an outer surface thereof via an adhesive layer, and
    wherein the thickness of the first glass sheet is larger than the thickness of the second glass sheet.

2. The laminated glass according to claim 1, wherein each of the thicknesses of the first glass sheet and the second glass sheet is ⅕ or less of the thickness of the core material.

3. The laminated glass according to claim 1, wherein a thickness of the cover sheet is from 0.1 mm to 5 mm.

4. The laminated glass according to claim 1, wherein the cover sheet comprises a protective film on an outer surface thereof.

5. The laminated glass according to claim 1, wherein the core material consists of the resin sheet.

6. The laminated glass according to claim 1, wherein the core material further comprises at least one sheet-shaped member made of a resin laminated on the resin sheet via an adhesive layer.

7. The laminated glass according to claim 6, wherein the at least one sheet-shaped member made of the resin is formed of a material different from a material of the resin sheet.

8. The laminated glass according to claim 1,
    wherein the resin sheet is formed of polycarbonate, acrylic, or polyethylene terephthalate, and
    wherein the cover sheet is formed of polycarbonate, acrylic, or polyethylene terephthalate.

9. The laminated glass according to claim 1, wherein each of the first glass sheet and the second glass sheet is an alkali-free glass sheet.

10. A vehicle comprising at least one window including the laminated glass according to claim 1.

* * * * *